May 26, 1970     F. G. RICK     3,513,946
HYDRAULIC BRAKE SYSTEM WITH PLURAL ACTUATING
MEANS AND LOCKING MEANS THEREFOR
Filed July 16, 1968     2 Sheets-Sheet 1

INVENTOR.
FRANK G. RICK
BY
Charles L. Lovercheck
attorney

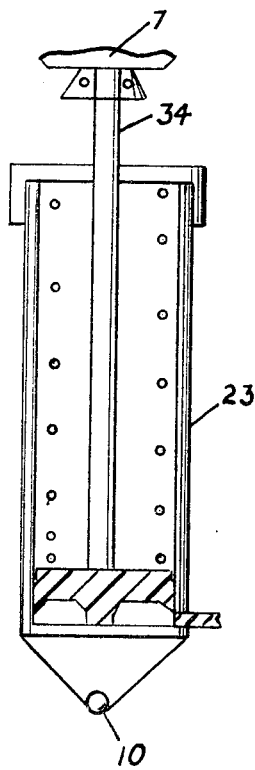
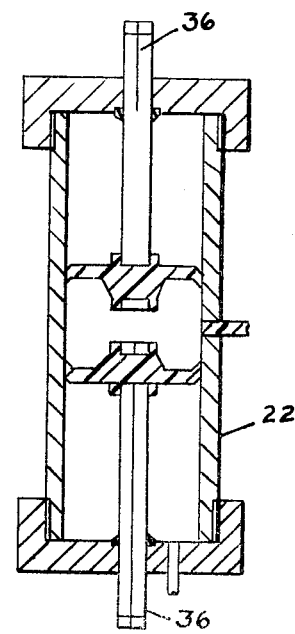
Fig. 3
Fig. 4

United States Patent Office 3,513,946
Patented May 26, 1970

3,513,946
HYDRAULIC BRAKE SYSTEM WITH PLURAL ACTUATING MEANS AND LOCKING MEANS THEREFOR
Frank G. Rick, 114 Gilfillan St., Franklin, Pa. 16323
Filed July 16, 1968, Ser. No. 745,172
Int. Cl. F16d 51/24
U.S. Cl. 188—78                                        1 Claim

ABSTRACT OF THE DISCLOSURE

A brake for a vehicle or the like having a drum and two shoes inside the drum with the ends of each shoe adjacent the ends of the other shoe. A hydraulic cylinder is disposed in the space between the adjacent ends of the shoes. A cam is disposed on each shoe intermediate the ends. A lever is attached to each cam and a toggle link arrangement is attached to the end of each shoe opposite the first mentioned cylinder. A second cylinder has one end fixed relative to the auto frame with its piston rod attached to the toggle linkage. Two hydraulic lines are provided, one is attached to each cylinder. The main service brake cylinder may be connected by one line to the second mentioned cylinder and the emergency brake cylinder may be connected to the first mentioned cylinder. A key actuated valve is connected to each line so that by locking the key, fluid is trapped in both cylinders, thus locking the brakes. The brake is so arranged that either cylinder can fail and yet the system will still operate.

---

This invention relates to brakes and, more particularly, to brakes and braking systems for vehicles such as automotive passenger cars, buses, trucks and the like. It has utility in aircraft and other vehicles.

It is an object of the invention to provide an improved brake.

Another object of the invention is to provide an improved braking system.

Another object of the invention is to provide an improved emergency braking system.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIGS. 3 and 4 are cross sectional views of a brake cylinder according to the invention.

Figure 1:
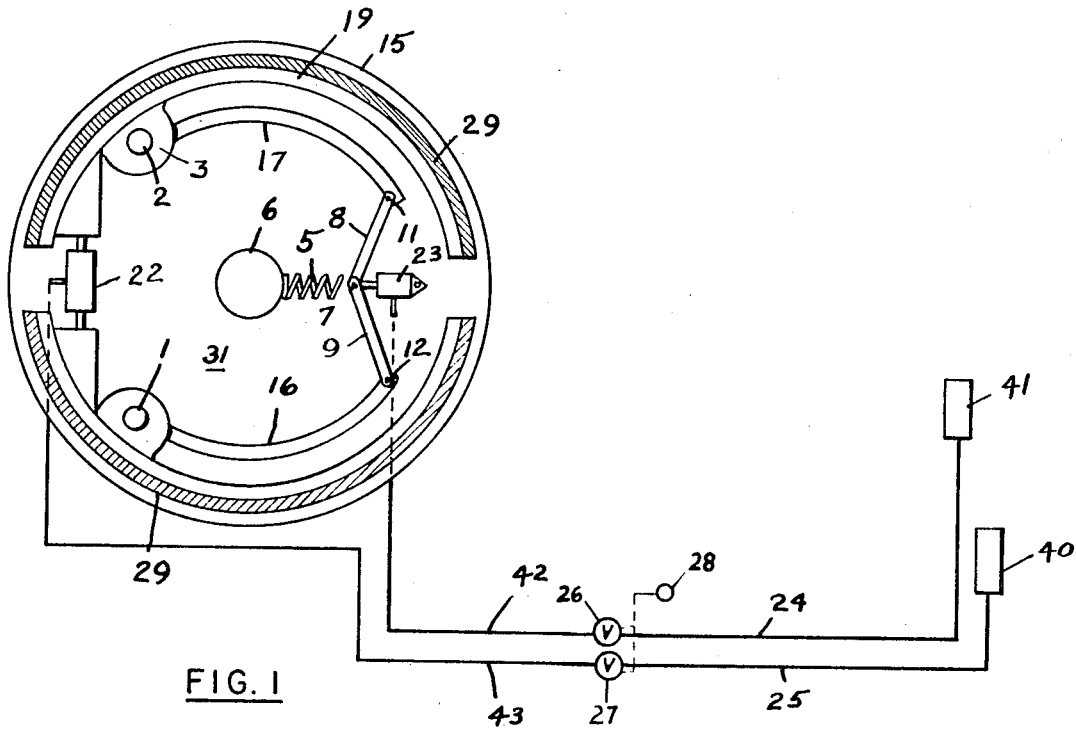
FIG. 1 is a side schematic view of the brake system according to the invention.
Figure 2:
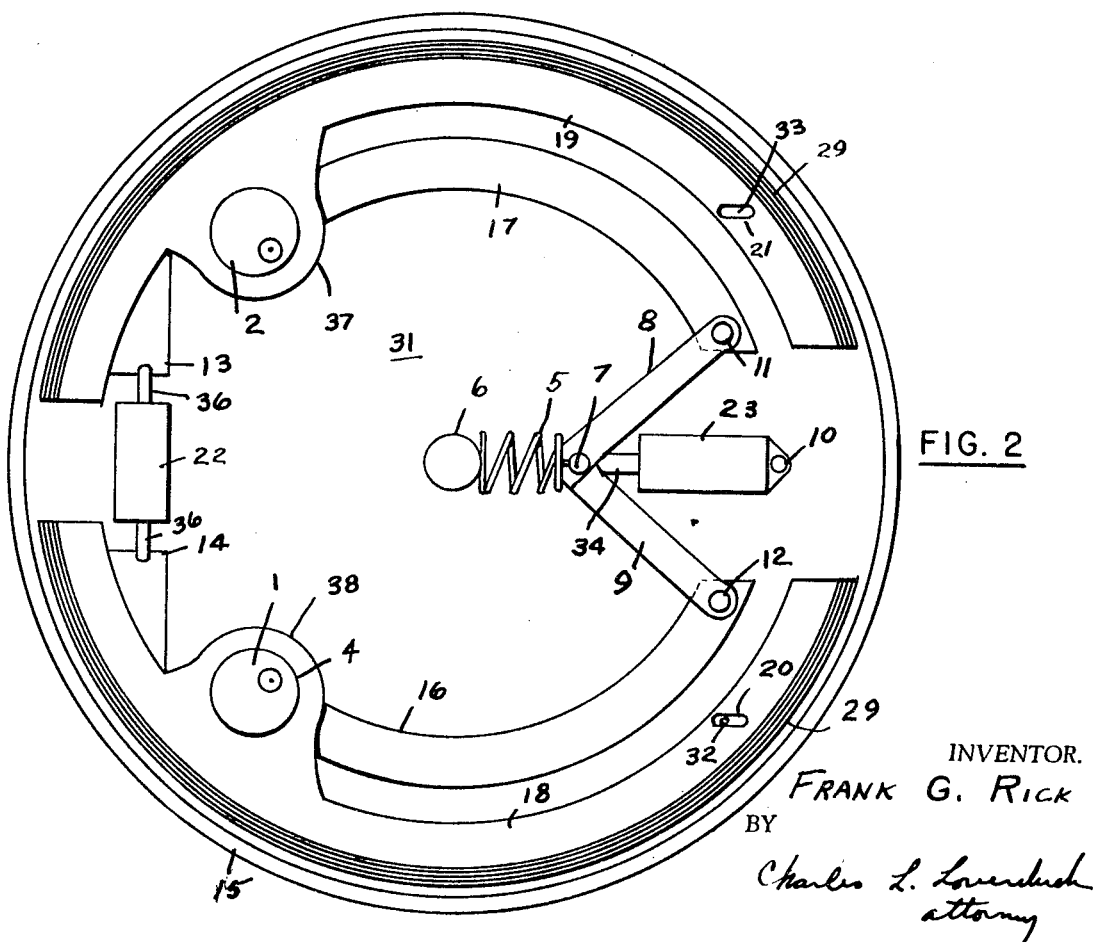
FIG. 2 is a schematic view of a brake according to the invention.

Now with more particular reference to the drawings and to the brake shown in FIG. 2 and the system shown in FIG. 1, it will be noted that the brake is made up broadly of the brake drum 15 and brake shoes 18 and 19 that have suitable linings 29 of a conventional type. The brake shoes are supported in the drum and on the vehicle axle 31 by means of bosses or cams 1 and 2 and pins 32 and 33 which are received in slots 20 and 21. Levers 16 and 17 are attached to cams 1 and 2 at their first end and at their second end are connected to links 8 an 9. Links 8 and 9 are connected to pins 16 and 17 respectively by pins 11 and 12.

The master cylinder 23 is pivoted to the axle 31 by means of the pin 10, and it is connected to the pin 7 by means of its piston rod 34. The emergency brake cylinder 22 has two piston rods 35 and 36, which are connected to bosses 13 and 14 on brake shoes 19 and 18, respectively. Cams 1 and 2 are received in cam ways 3 and 4, which are openings in the bosses 37 and 38 on the brake shoes.

The spring 5 is received between the boss 6 and the pin 7, and it urges the links to a position to disengage the brake shoes and to retract piston rod 34 into the piston 23.

Emergency brake actuating cylinder 40 is connected through line 25 and valve 27 and line 43 to the emergency brake cylinder 22. The service brake actuating cylinder 41 is connected through the valve 26 and line 42 to the main brake cylinder 23.

OPERATION OF THE BRAKE

The brake is operated the same as a conventional brake on an automobile in that when the main brake cylinder 41 is actuated by a brake pedal or the like and the key 28 is in open position, fluid will flow through valve 27 to the main brake cylinder 22 and the brake will be applied. This is assuming, of course, that the key 28 is in open position.

When the emergency brake cylinder is actuated by depressing both the emergency brake pedal and the main brake pedal, both main brake cylinder and emergency brake cylinder are operated, applying the brakes. The operator may then lock the key which will trap the fluid inside the cylinders 22 and 23. This stops and maintains hydraulic pressure to the cylinders.

To release the brakes, the key is replaced and turned to the "on" position in the brake lock. This allows the pressure to be released in the cylinders, the brakes are therefore released, and the car can be moved.

When the ignition key is turned on, the brake light indicator will show the brakes are on. When the light indicates that the brakes are in locked position, the operator will be warned not to attempt to move the vehicle.

The foregoing specification sets forth the invention in its preferred practical forms but the structure shown is capable of modification without departing from the invention which is to be understood is broadly novel as is commonsurate with the appended claim.

The embodiments of the invention in which an exclusive property or privilege is claimed are defined as follows:

1. A brake system comprising a main brake cylinder and an emergency brake cylinder,
   two brake shoes each having a first end and a second end,
   said first ends of said brake shoes terminating adjacent each other,
   a brake drum,
   a main cylinder,
   an emergency cylinder,
   a first brake cylinder connected to said first ends of the brake shoes,
   a second brake cylinder connected to said shoes intermediate their ends,
   a first line connecting said main cylinder to said first brake cylinder,
   a second line connecting said emergency brake cylinder to said second brake cylinder,
   and valve means for obstructing flow of fluid through said lines whererby said shoe may be locked in position against said drum,
   a first cam disposed in engagement with one said brake shoe and a second cam disposed in engagement with the other of said brake shoes, a first lever attached to said first cam and a second lever attached to said second cam,
a first link having a first and second end having its first end attached to said first lever,
a second link having a first end and a second end having its said first end attached to said second lever.
said second ends of said links being connected together,
a helical compression spring engaging said second end of said links urging said links to move said levers to a position to release said brakes,
and said main brake cylinder having its piston rod connected to said links.

References Cited

UNITED STATES PATENTS

| | | |
|---|---|---|
| 1,701,505 | 2/1929 | Perrot. |
| 2,619,203 | 11/1952 | Shaw. |
| 3,194,353 | 7/1965 | Rick. |

GEORGE E. A. HALVOSA, Primary Examiner

U.S. Cl. X.R.

188—106, 152; 192—3